Figure 1:
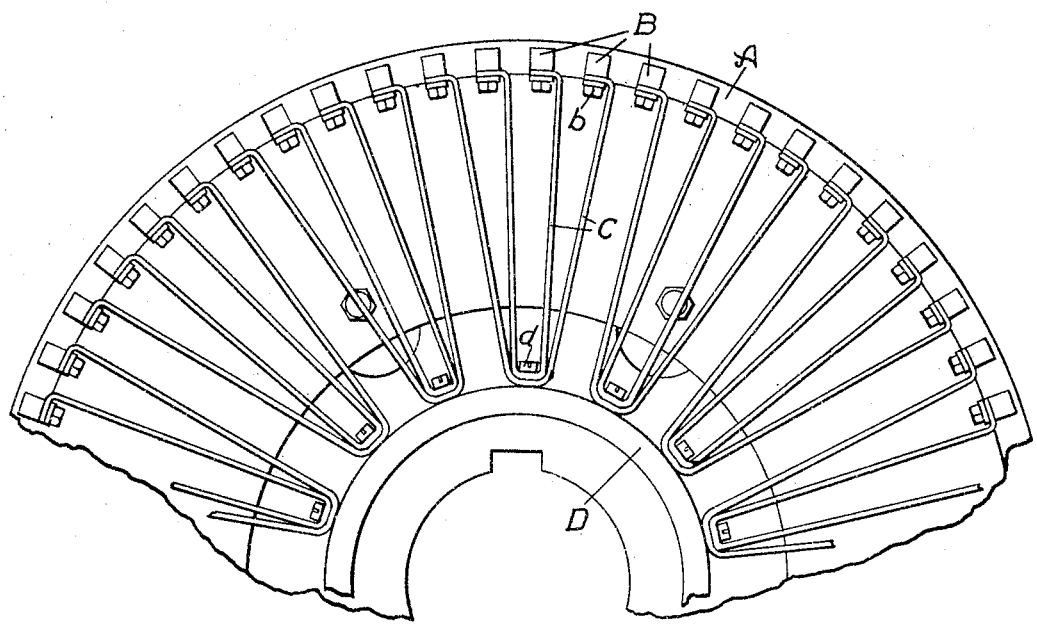

No. 782,054. PATENTED FEB. 7, 1905.
H. G. REIST.
INDUCTION MOTOR.
APPLICATION FILED JULY 11, 1904.

WITNESSES:
INVENTOR:
Henry G. Reist.
by Albert G. Davis
Atty.

No. 782,054.                                      Patented February 7, 1905.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

INDUCTION-MOTOR.

SPECIFICATION forming part of Letters Patent No. 782,054, dated February 7, 1905.

Application filed July 11, 1904. Serial No. 215,995.

*To all whom it may concern:*

Be it known that I, HENRY G. REIST, a citizen of the United States, residing at Schenectady, county of Schenectady, State of New York, have invented certain new and useful Improvements in Induction-Motors, of which the following is a specification.

My invention relates to squirrel-cage windings for induction-motors.

It is well understood in the art that an induction-motor having a short-circuited squirrel-cage winding takes a large starting-current and has a small starting torque. To improve the starting characteristics of such motors and at the same time to avoid the necessity for a coil-wound rotor with collector-rings or switching devices, it has been proposed heretofore to connect the conductors to the short-circuiting ring through flat end connections instead of directly. These end connections may be made of sufficiently small cross-section to heat up at starting, and thus automatically to insert an appreciable resistance in the rotor-circuit. When the motor is up to speed, however, the circulation of air produced by the rotation of the rotor cools the flat strips, so that their resistance is greatly reduced. The strips are made flat, so as to present a large radiating-surface for a given cross-section. This arrangement, which has been proposed heretofore, has introduced certain difficulties in the construction of the motor. Since space is a desideratum in the design of a motor, it is not feasible to extend the connections outwardly from the ends of the conductors. A construction that has been employed heretofore consists in extending the flat connections radially inward from the ends of the conductors to a short-circuiting ring of smaller diameter than the rotor. With this construction the end connections were attached to the conductors and to the short-circuited ring by slotting both the conductors and the ring and forcing the flat end connections into the slots. This construction is satisfactory as regards the attachment to the conductors, since the connections may be riveted in place after being placed in the slots; but it is not practical to rivet the connections after placing them in slots in the end rings, and consequently difficulty has been encountered heretofore in obtaining secure and proper contact between the end connections and the short-circuiting ring.

My invention consists in a novel arrangement of the end connections, whereby a simple and efficient means for attaching the short-circuiting rings may be employed.

My invention will best be understood by reference to the accompanying drawings, in which—

Figure 2:
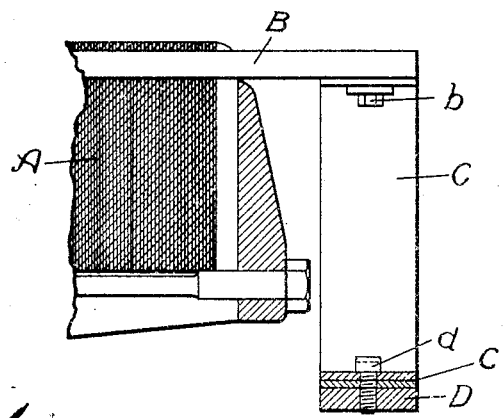

Figure 1 shows an end view of a rotor arranged with end connections in accordance with my invention, and Fig. 2 shows a detail in cross-section of the same.

In the drawings, A represents the armature or rotor body carrying the conductors B in slots or holes at or near its periphery.

D represents a short-circuiting ring connected to the ends of the several conductors B by the end connections C. These end connections, which are made of flat strips for the purpose heretofore explained, are formed in the shape of the letter U, the extremities of the U being attached to a pair of conductors B in any suitable manner, as by means of the bolts $b$, and the base of the U being attached to the short-circuiting ring D by the bolts $d$. The U's formed by the end connections may be of different widths, as shown in the drawings, and grouped one within another, so that a plurality of these connections may be attached to the short-circuiting ring by a single bolt, as shown. It is evident that this arrangement offers a simple means for attaching the end connections to the short-circuiting ring and that excellent electrical contact may be obtained in this manner.

What I claim as new, and desire to secure by Letters Patent of the United States, is—

1. In an alternating-current motor, a rotor-body, conductors carried thereby, a conducting-ring of smaller diameter than the rotor, and U-shaped conductors each connecting a plurality of said rotor-conductors to said ring.

2. In an alternating-current motor, a rotor-body, conductors carried thereby, a conducting-ring of smaller diameter than the rotor, and U-shaped conductors, each having its extremities attached to a pair of rotor-conductors and its base attached to said ring.

3. In an alternating-current motor, a rotor-body, conductors carried thereby, a conducting-ring of smaller diameter than the rotor, U-shaped conductors of different widths and grouped one within another, each of said U-shaped conductors having its extremities attached to a pair of conductors, and attaching means passing through the bases of a group of said U-shaped conductors and securing said group to said ring.

In witness whereof I have hereunto set my hand this 8th day of July, 1904.

HENRY G. REIST.

Witnesses:
BENJAMIN B. HULL,
HELEN ORFORD.